Figure 5:
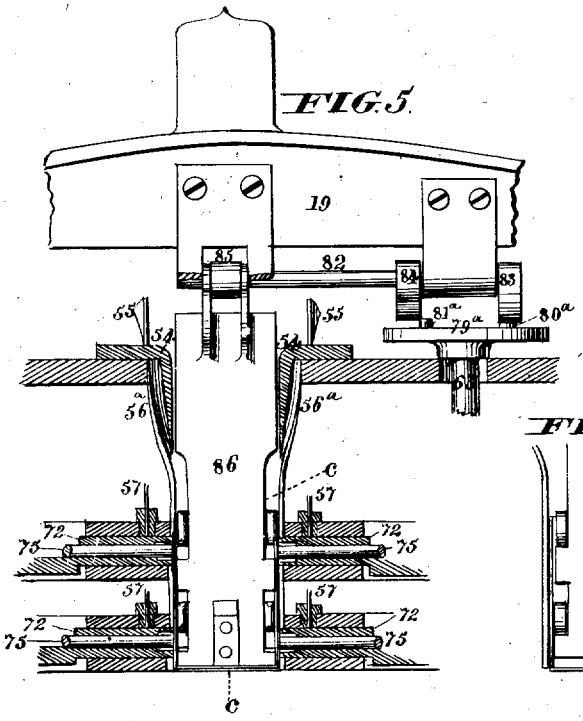

4 Sheets—Sheet 1.
H. R. HEYL & A. BREHMER.
PAPER-BOX MACHINE.
No. 6,745. Reissued Nov. 16, 1875.
FIG. 15.
FIG. 1.
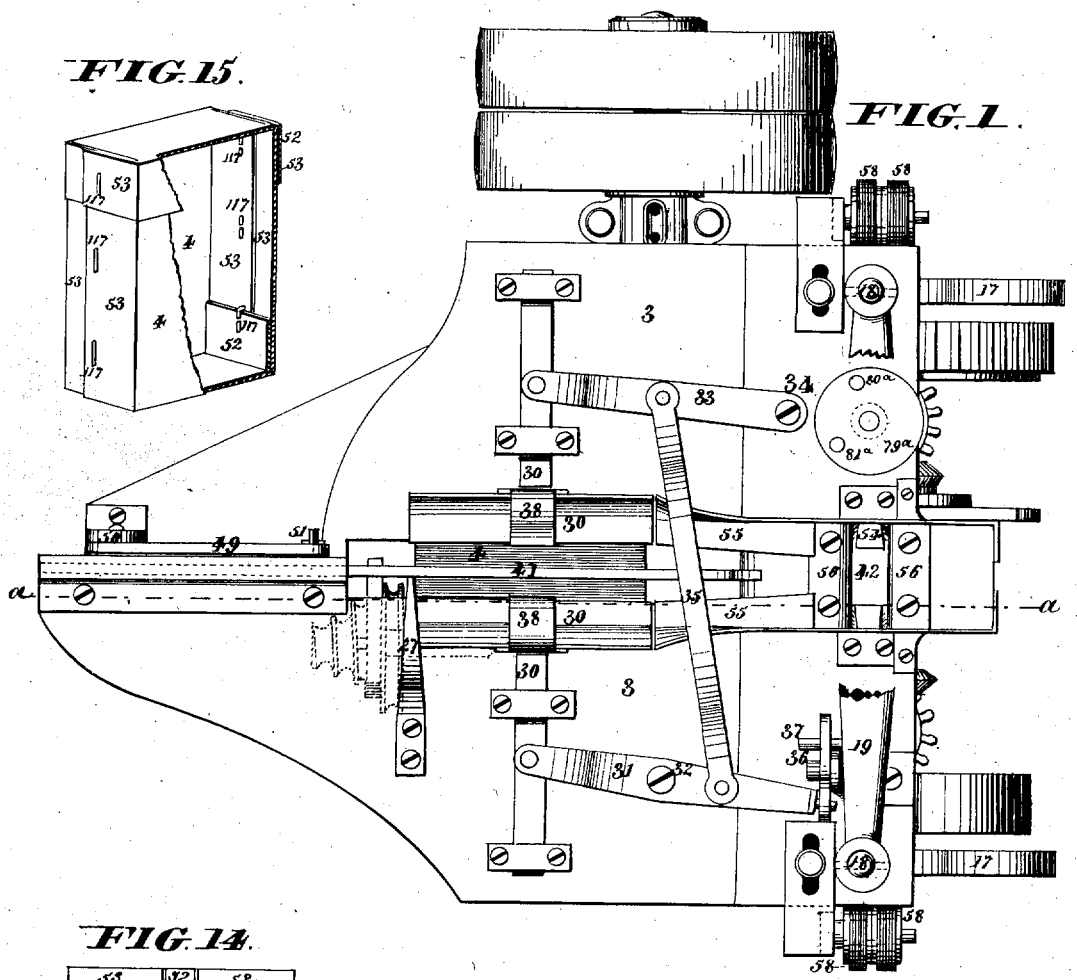
FIG. 14.
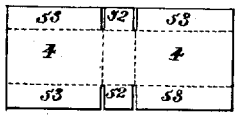
FIG. 4.
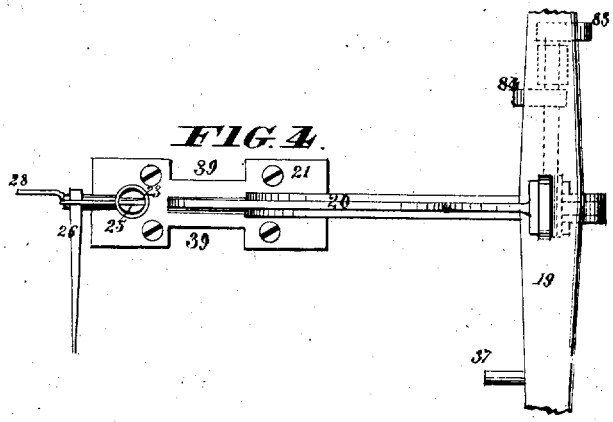
WITNESSES
F. E. Smith
Chas J. Gooch
INVENTOR
Henry R. Heyl
August Brehmer
Knight Bros. Attorneys 4 Sheets—Sheet 2.
H. R. HEYL & A. BREHMER.
PAPER-BOX MACHINE.
No. 6,745. Reissued Nov. 16, 1875.
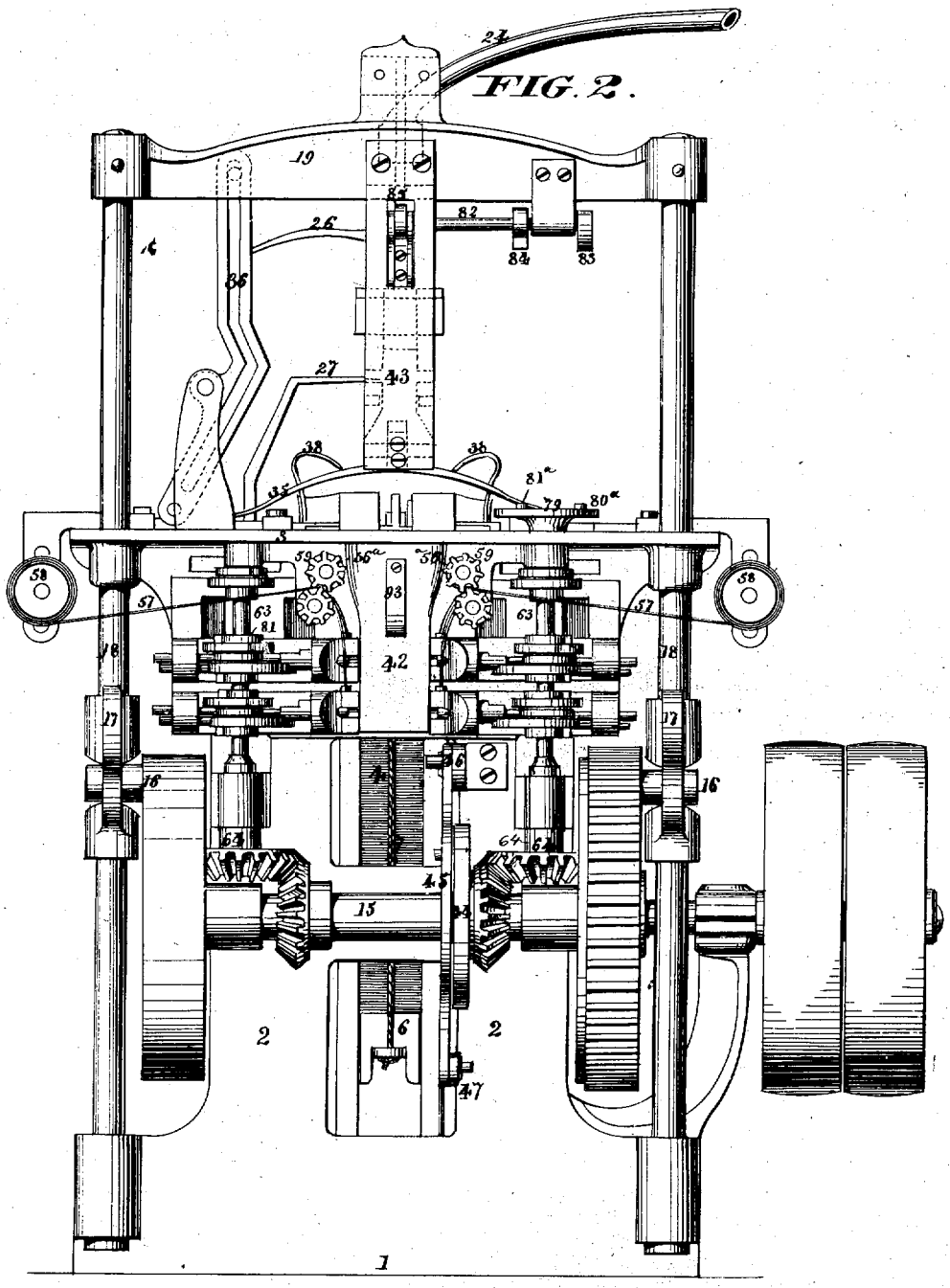
WITNESSES
F. E. Smith
Chas J Gooch
INVENTOR
Henry R. Heyl
August Brehmer
by Munn & Co. Attorneys

H. R. HEYL & A. BREHMER.
PAPER-BOX MACHINE.
No. 6,745. Reissued Nov. 16, 1875.
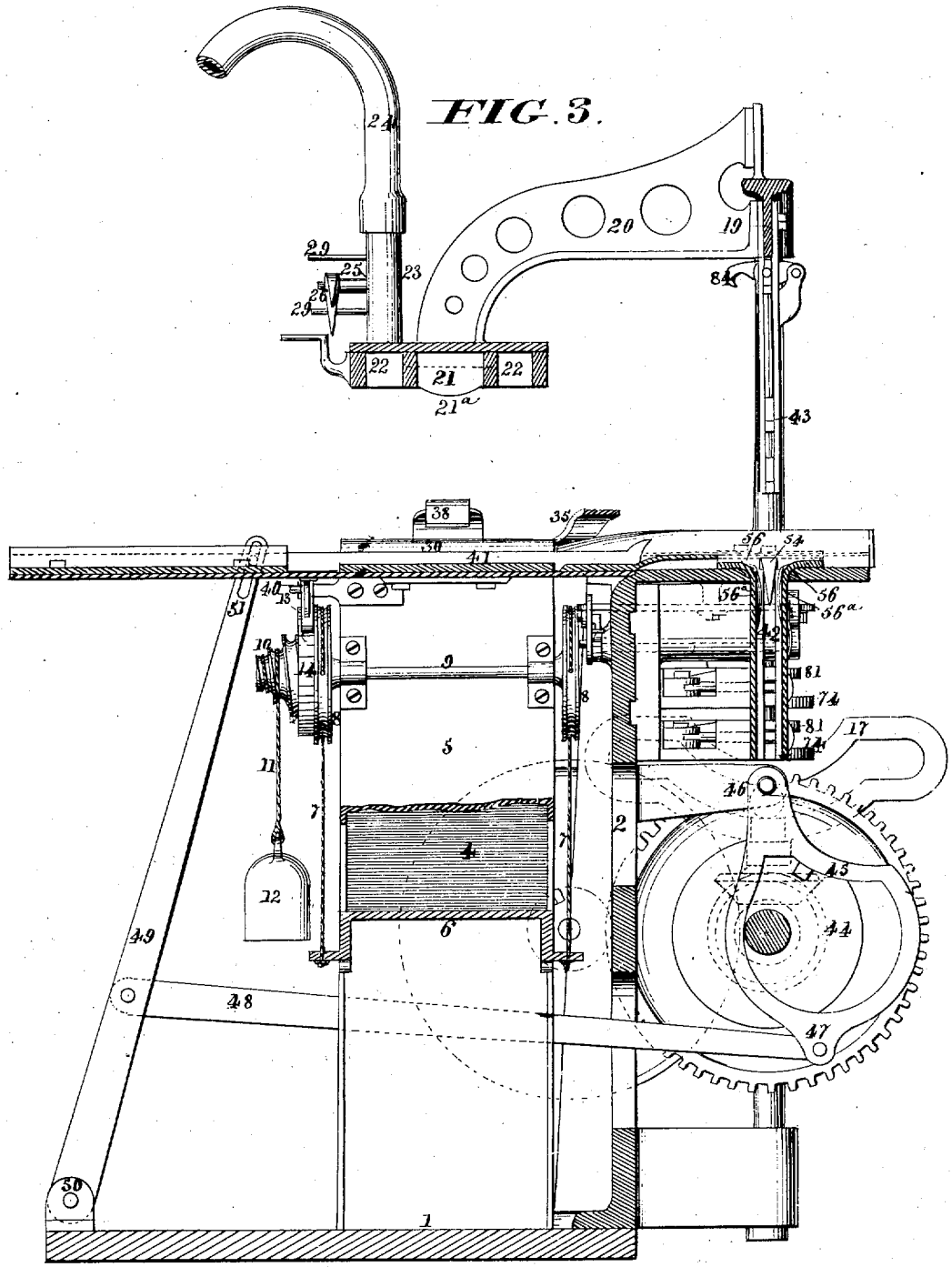
WITNESSES
F. E. Smith
Chas J. Cooch
INVENTOR
Henry R. Heyl
August Brehmer
By Knightsbros Attorneys

H. R. HEYL & A. BREHMER.

PAPER-BOX MACHINE.

No. 6,745. Reissued Nov. 16, 1875.

WITNESSES

F. E. Smith

Chas. J. Gooch

INVENTOR

Henry R. Heyl

August Brehmer

By Knight Bros. Attorneys

UNITED STATES PATENT OFFICE.

HENRY R. HEYL AND AUGUST BREHMER, OF PHILADELPHIA, PENNSYLVANIA, ASSIGNORS TO THE NOVELTY PAPER-BOX COMPANY.

IMPROVEMENT IN PAPER-BOX MACHINES.

Specification forming part of Letters Patent No. 132,078, dated October 8, 1872; reissue No. 6,745, dated November 16, 1875; application filed July 30, 1875.

*To all whom it may concern:*

Be it known that we, HENRY R. HEYL and AUGUST BREHMER, both of the city and county of Philadelphia, in the State of Pennsylvania, have invented a Machine for Making Boxes of Paper, Pasteboard, and other material, of which the following is a specification:

The machine is intended primarily for making boxes of paper or pasteboard without cement, the fastening being effected by wire staples, which are produced and applied by the machine which forms the boxes. The box blanks are placed in a receptacle provided with a sliding bottom, which is drawn up by a weight and cord applied to a fusee-pulley adapted to graduate the power of the weight to correspond with the number and weight of the blanks remaining in the receptacle. The weight-pulley is detained by a ratchet, which prevents the drawing up of the sliding bottom, excepting when the said ratchet is retracted. The blanks are taken one by one from the top of the pile by a pneumatic or section feeder, provided with automatic valves to adapt it to seize and drop the blanks at the proper moments. The said feeder, in its descent, retracts the detent-ratchet, and receives a slight upward pressure from the pile of blanks. As the feeder rises again with one blank the detent, being released, catches the weight-pulley, so that, whether the quantity of blanks be greater or less, the top of the pile always rests at one level to receive the feeder. The blank, being deposited on a table by the feeder, is carried forward by a follower to a position over the mold, into which it is forced by a plunger, the bottom flaps being first bent up, and the end flaps next folded over them as the plunger descends. The wire to form staples is, in continuous lengths, contained on reels, equal in number to the staples used in each box. The wires being fed forward by rollers at each stroke of the machine, the necessary length to form a staple is cut from each wire by an annular or forked cutter, working over a transverse mandrel, around which the wire is bent into the form of a staple by the pressure of the cutter. The cutter is formed with internal longitudinal grooves, which receive the staple as it is formed, and hold it securely while it is carried by the motion of the cutter to the proper position to be driven. The mandrel then recedes, and the staple is driven through the lapped sides of the box by a hammer or push-rod, working concentrically within the annular cutter. Cavities in the plunger receive inwardly-projecting ends of the staple, which ends are then bent in opposite directions, either toward or away from each other, by slides or clinchers working in the sides of the plunger, while the head of the staple is still held by the driver. The plunger is then withdrawn, and its descent with a new box discharges that which was previously formed. The various parts are made changeable or adjustable, to adapt them for the manufacture of boxes of various sizes or forms.

Figure 6:
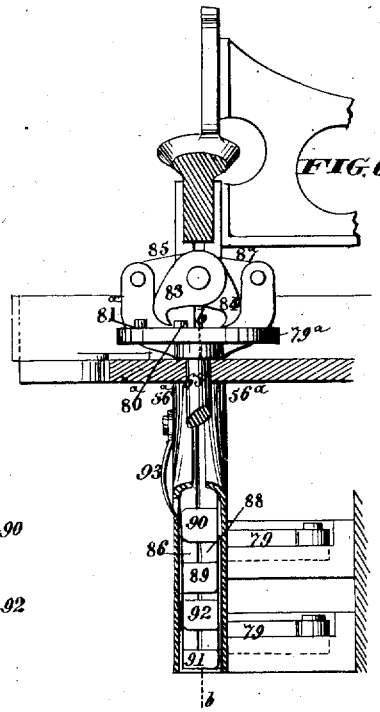
Figure 7:
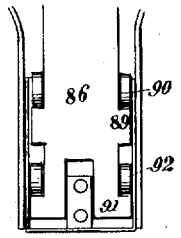
Figure 8:
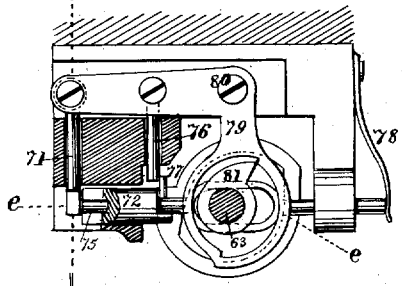
Figure 11:
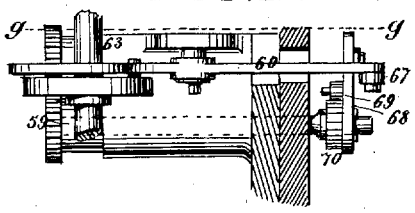
Figure 9:
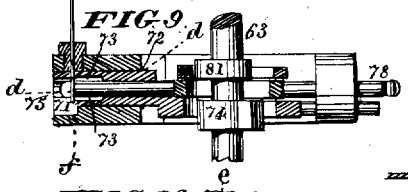
Figure 13:
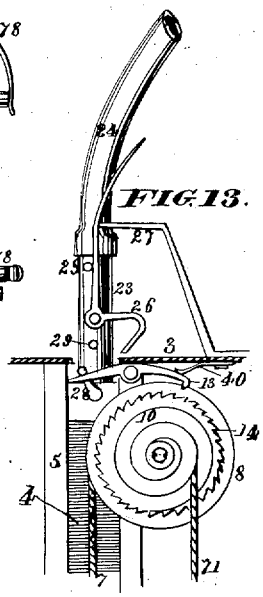
Figure 12:
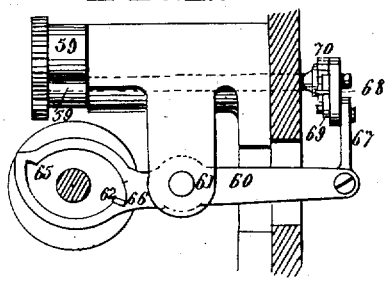
Figure 10:
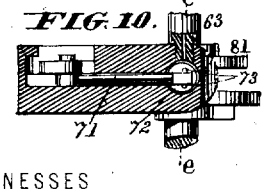

In the accompanying drawing, Figure 1 is a plan or top view of a machine illustrating the invention, with some of the upper works omitted. Fig. 2 is a front elevation. Fig. 3 is a vertical section at *a a*, Fig. 1. Fig. 4 is a plan of the upper part omitted in Fig. 1. Fig. 5 represents a vertical section of the box-mold at *b b*, Fig. 6, and an elevation of the plunger that works therein, as hereinafter described. Fig. 6 is a vertical section of the same parts in the same position in the plane indicated by the line *c c*, Fig. 5. Fig. 7 is a section at *b b*, Fig. 6, showing the parts in a different position. Fig. 8 is a horizontal section at *d d*, Figs. 9 and 10, of the devices employed to cut the wire and form and drive staples to fasten the parts of the box together. Fig. 9 is a vertical section of the same at *e e*, Figs. 8 and 10. Fig. 10 is a vertical section thereof at *f f*, Figs. 8 and 9. Fig. 11 is a sectional elevation of the mechanism employed for feeding the wire. Fig. 12 is a horizontal section of the same at *g g*, Fig. 11. Fig. 13 is a sectional elevation of the blank-feeding apparatus hereinafter described, and Fig. 14 is a plan of a box-blank. Fig. 15 is a perspective view of a box.

The main frame of the machine consists of a bed, 1, standards 2, and table 3, of proper construction to support and afford bearings for the various working parts. The box-blanks 4 4 consist of simple rectangular pieces of paper or other material, which may be cut without waste, and are prepared by slitting, as shown in Fig. 14, to separate the end flaps from the bottom flaps. The box-blanks before being placed in the machine may be slightly bent into convex form to facilitate the separation of the uppermost one, as hereinafter described. Any desired number of these blanks are placed in a vertical pile within a receptacle, 5, resting on a sliding bottom, 6, which bottom is drawn up as fast as the blanks are removed by cords 7 7 passing over pulleys 8 8, attached to a shaft, 9, upon which is also keyed a fusee-pulley, 10, carrying a cord, 11, from which is suspended a weight, 12. These parts are so constructed and arranged that the weight 12 will more than counterbalance the box-blanks resting on the sliding bottom 6; and as the reduction of the pile of blanks permits the weight 12 to descend the cord 11 reaching a smaller part of the fusee 10 will act with less leverage on the elevating-cords 7, and hence the upward pressure of the bottom 6 may be graduated approximately in proportion to the weight of the box-blanks resting thereon.

13 is a detent-pawl engaging with a ratchet-wheel, 14, to prevent the elevation of the bottom 6, excepting at proper periods, when the detent is retracted.

The arrangement of the parts is such as to cause the top of the pile-blanks, whether the pile be large or small, to be kept at about the same distance below the level of the table 3, as will be presently explained. 15 is the main driving-shaft with cranks 16 16, which work in yokes 17 17 on rods 18 18, attached at top to a cross-head, 19, carrying a horizontal arm, 20, to which is attached the feeder 21. This feeder is formed with cavities 22 in its under side, communicating with a nozzle, 23, to which is attached a loose or flexible tube, 24, connecting with an air-pump, or any suitable exhaust apparatus. Within the nozzle 23 is a throttle-valve, 25, controlled by a bell-crank tappet, 26, one end of which, as the feeder 21 descends and presses on the topmost blank 4, strikes a stud, 27, to open the valve. The air is thus exhausted beneath the feeder. At the same time a stud, 28, on the feeder 21 strikes the heel of the detent-pawl 13, retracting it from the ratchet-wheel 14, and causing the weight 12 to press the blanks up against the feeder as the latter ascends, and to elevate the pile of blanks until the stud 28 releases the pawl 13, when the latter instantly catches the ratchet-wheel 14, to prevent the blanks rising further. The topmost blank being held by atmospheric pressure against the face of the feeder will be drawn up from the pile. The feeder may have one or more of the cavities 22 communicating with the suction-tube 23, and one or more of the projections or bars 21ª, Fig. 3, placed between the cavities 22, or on one or both sides of a single cavity. The illustration shows suction-cavities at the ends of the feeder, and a projecting ridge between them. We have used with good effect a central cavity and ridges at the ends. The mouths or margins of the suction-cavities 22 have flat faces, giving them an effective hold on the blank, and the projection or projections 21ª, by depressing another part of the blank, prevent more than one blank following it. 29 29 are pins upon the feeder, to limit the movement of the valve-tappet 26 in either direction. (See Figs. 3 and 13.) Upon the table 3, directly over the blank-receptacle, is a pair of sliding plates, 30 30, which recede from each other as the plunger descends, and remain apart until the plunger has ascended with a blank, when the plates again close over the blank-receptacle and receive the blank, which drops from the feeder 21 as soon as the valve 25 is closed by the lower end of the tappet 26 striking the arm 27. The movement of these sliding plates is produced by levers 31 and 33, the former being fulcrumed at its center 32, and the latter at one end, 34, and the two being connected by a rod, 35. The forward end of the lever 31 is jointed to a vertical lever, 36, which is fulcrumed to a stationary standard on the frame, and is operated by a stud, 37, on the cross-head 19 working in a slot in said lever 36. Lips 38, Figs. 1, 2, and 3, attached to the sliding plates 30, and projecting over the same within recesses 39, Fig. 4, in the sides of the feeder 21, insure the deposit of the blanks from the bottom of the plunger onto the plates 30. A spring, 40, is applied to the detent-pawl 13, to cause it to act promptly in arresting the motion of the shaft 9. The box-blank being deposited on the sliding plates 30, a sliding rod, 41, is moved forward, carrying the blank centrally over the mold 42 and beneath a plunger, 43, projecting downward from the center of the cross-head 19. The sliding rod 41 is then instantly drawn back.

The motions of this sliding rod are effected by a cam, 44, on the main driving-shaft 15, working in a yoke-lever, 45, fulcrumed at 46 to the stationary frame, and jointed at 47 to the forward end of a connecting-rod, 48, the rear end of which is jointed to a vertical lever, 49, which latter is fulcrumed at its lower end 50 to the stationary frame, and at its upper end 51 is jointed to the rear end of the rod 41. 55 55 are guide-plates, projecting upward sufficiently to conduct the blanks over the elevated folders 54 54. The next descent of the cross-head 19 causes the plunger 43 to carry the blank down into the mold 42, in which the box is formed. This mold consists of two bottom-flap folders and two end-flap folders, the latter with two inclined flanges each arranged in combination, so as to fold the box-blank around the plungers as the latter descends into the mold. The bottom-flap folders 54 54 are elevated a little above the others, so that the plunger first forces the box-blank between them in its downward movement, thereby folding the bottom flaps 52 52 up against the plunger. Then, as the plunger descends still farther, the box-blank is forced between the side folders 56 56, which causes the sides of the box-blank 4 4 to fold also up against the plunger. The next operation consists of folding the end flaps 53 53 also around the plunger, and over the bottom flaps 52 52, which latter are still held against the plunger by the long points of the end folders until the end flaps 53 53 are folded around sufficiently to retain the bottom flaps 52 52 in place. This folding of the end flaps 53 53 is done by the inclined flanges 56ᵃ 56ᵃ, projecting from the side folders 56 56 at each corner of the mold. These flanges are so narrow that they do not extend across or overlap each other, but project only a short distance around the ends of the box, leaving space enough between each opposite pair to admit the mechanism that inserts the wire staples into the box. The flanges gradually assume a right angle with the side folders as they near the bottom, so that, when the box is clear down into the mold, the flaps 53 53, to form the ends of the box, are bent around in position to receive the wire staples. Each pair of opposite flanges are so inclined in relation to each other that the side flaps are folded around at the same time when their edges are intended to meet flush, or one flange should be inclined a little in advance of the other if the side flaps are intended to overlap each other, as is the case in the form of box here represented.

The box is now completely shaped, and is held within the mold in readiness for the fastenings. The wire 57 is wound in continuous lengths on reels 58 58, Figs. 1 and 2, from which it is drawn by feed-rollers 59 59, driven intermittently by the mechanism shown in Figs. 11 and 12. This mechanism consists of a horizontal yoke-lever, 60, fulcrumed at its center 61, and inclosing a wrist-pin, 62, on the vertical shaft 63, driven by bevel-pinions 64. (See Fig. 2.) The yoke of the lever 60, in which the wrist-pin 62 works, is formed with two shoulders, 65 66, with which the said wrist-pin engages alternately to move the lever in opposite directions. No effect is produced on the lever while the pin passes over the curves between the shoulders. A connecting-rod, 67, at the free end of the lever 60, is jointed to an arm, 68, carrying a pawl, 69, which engages with a ratchet-wheel, 70, on one of the roller-shafts, the two rollers of each pair being geared to turn together.

It will thus appear that each forward movement of the lever imparts a slight rotary movement to the feed-rollers, and the parts are so constructed and proportioned that each movement will feed forward a length of wire sufficient to form a staple.

One pair of feed-rollers, with their operating mechanism, may, as represented, feed all the wires used on one side of the machine.

The operation of cutting, forming, driving, and clinching will be described with reference to a single staple, it being understood that this operation is performed simultaneously in two, four, six, or even more places, according to the dimensions of the box which the machine is at the time employed to make. The drawing shows mechanism for applying four staples—two on each side. The mechanism for cutting, forming, and driving the staples is shown in Figs. 8, 9, and 10. A proper length of wire is severed and bent around a square mandrel, 71, by an annular punch or cutting-fork, 72, formed to pass transversely over the mandrel 71, and having in its interior longitudinal grooves 73, Figs. 9 and 10, which receive the wire as it is bent around the mandrel, and hold the staple in proper position for driving. The reciprocating movement of the punch or cutting-fork 72 is imparted by a cam, 74, upon the shaft 63. Within the punch 72 is a sliding hammer, 75, which is held back by pins 76 and 77, and, when released by the retraction of the pin 76, is driven forward by a spring, 78. The pin 77 projects from the hammer 75. The mandrel 71 and pin 76 are both attached to a crank-lever, 79, fulcrumed at 80, and moved back and forth by a cam, 81, on the shaft 63. As soon as the motion of this lever withdraws the mandrel 71 from before the staple, the latter being still held in position by the grooves 73, the pin 76 releases the pin 77, permitting the spring 78 to drive the hammer 75 forward with a sharp percussion on the staple, driving it through the two or three thicknesses of paper, and thus connecting the laps of the box. The legs of the staples are securely held and guided by the longitudinal grooves in the punch or fork 72, so as to prevent their bending while the staple is driven through the paper. The ends of the staples are received in suitable cavities in the edges of the plunger 43. The mechanism for clinching or bending over the ends of the staples is represented in Figs. 5, 6, and 7. Fig. 5 and 6 show the positions of the parts when the staples are driven, and before they are clinched. Fig. 7 shows the position when they are clinched. On the head of the vertical shaft 63 is a disk or wheel, 79ᵃ, from the upper surface of which project two pins, 80ᵃ and 81ᵃ, which operate a rock-shaft, 82, mounted horizontally in bearings under the cross-head. This rock-shaft has a pair of tappets, 83 and 84, on which the pins 80ᵃ and 81ᵃ act successively. Upon the shaft 82 are rigid arms 85 87 projecting in opposite directions, and each connected to a slider, 86 88, which two sliders constitute the plunger 43. 89 and 91 represent horizontal lugs on the slider 86, and 90 and 92 similar lugs on the slider 88. These lugs are arranged alternately as represented, so that the motion of the shaft 82, in one direction, by depressing the slider 86 and elevating the slider 88, withdraws the two lugs 89 and 90 toward each other, and the two lugs 91and 92 toward each other.

As soon as the downward stroke of the cross-head 19 has formed the box within the mold, and the staples have been driven, in the manner explained, one of them with its ends between the lugs 89 and 90, and the other with its ends between the lugs 91 and 92, the rotation of the shaft 63 throws the pin 80 against the tappet 83, rocking the shaft 82 in one direction, bringing together each pair of lugs 89 90 and 91 92, so as to bend the two ends of each staple toward each other flat against the surface of the material, and effectually secure them, without the necessity of subsequent hammering. This position of the parts is shown in Fig. 7. The subsequent contact of the pin 81[a] with the tappet 84 rocks the shaft in the other direction, so as to open or separate the lugs in readiness for the next operation. A spring, 93, catching over the top of the box prevents it rising with the plunger, and when the plunger again descends with a new blank the previously-finished box is expelled through the bottom of the mold.

A modification in the construction of the plunger is illustrated in Fig. 2. In this case the body of the plunger is made in one piece with a single slider working in it. The motion of the shaft in one direction throws down this slider, to bend down the upper part of each staple, and the reverse motion opens the cavity, as before. This opening of the cavity is performed directly before the action of the hammer 75, and is followed by the clinching action just described. The elevation of the plunger itself then bends up the lower member of each staple, and thus completes the clinching action.

The following is claimed as new:

1. The blank-holder 5 6 and graduated counterbalance device 8 9 10 11 12, combined and arranged, substantially as herein described, to elevate the blanks, as required, with a force varied proportionally to the height of the pile of blanks.

2. The detent 13 14, and automatic device for temporarily releasing the same, substantially as set forth.

3. The feeder 21, constructed with one or more cavities in its face, connected with a pipe for exhausting the air, in combination with the valve or valves operated by the descent and ascent of the feeder by mechanism, substantially as herein described.

4. The annular punch or bending-fork 72, constructed with a cutting-face, and with internal longitudinal grooves 73, so as to sever a staple-blank, bend it around a suitable mandrel, and hold and guide it for driving, as hereinbefore explained.

5. The reciprocating punch or bending-fork 72, operating to sever the wire to bend it over a suitable mandrel or former, and to carry the staple forward into position to be driven, substantially as described.

6. The reciprocating punch or bending-fork having a longitudinal central opening, through which a hammer or driving-rod may operate, substantially as described.

7. The punch or bending-fork 72 and mandrel 71, operating in combination, substantially as set forth, to form the staples.

8. The wire-clinchers, sliding in a plane parallel with the material through which the staple is driven, so as to clinch the staple ends flat down on such material, as explained, without subsequent hammering.

9. The combination of a hammer or driving-rod, to force a staple through the material, and bending mechanism, operating, substantially as described, to turn the points of the staple flat against the material while the hammer rests on the head thereof.

HENRY R. HEYL.
AUG. BREHMER.

Witnesses:
GEO. L. PFOUT,
WM. C. STEVENSON.